(12) United States Patent
Tiirola et al.

(10) Patent No.: US 8,014,352 B2
(45) Date of Patent: Sep. 6, 2011

(54) ADAPTIVE TRANSPORT FORMAT UPLINK SIGNALING FOR DATA-NON-ASSOCIATED FEEDBACK CONTROL SIGNALS

(75) Inventors: Esa Tiirola, Kempele (FI); Bernhard Raaf, Neuried (DE); Kari Pajukoski, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 351 days.

(21) Appl. No.: 12/214,808

(22) Filed: Jun. 19, 2008

(65) Prior Publication Data
US 2009/0033524 A1 Feb. 5, 2009

Related U.S. Application Data

(60) Provisional application No. 60/936,377, filed on Jun. 19, 2007.

(51) Int. Cl.
*H04W 4/00* (2009.01)
(52) U.S. Cl. .......................... 370/329; 370/342
(58) Field of Classification Search .............. 370/329, 370/336, 342, 491, 335; 375/261; 455/450, 455/509
See application file for complete search history.

(56) References Cited

U.S. PATENT DOCUMENTS

| | | | |
|---|---|---|---|
| 7,415,040 B1 * | 8/2008 | Hwang et al. | 370/469 |
| 2003/0095532 A1 * | 5/2003 | Kim et al. | 370/342 |
| 2005/0219999 A1 | 10/2005 | Kim | |
| 2007/0133480 A1 * | 6/2007 | Nam et al. | 370/335 |
| 2007/0189235 A1 * | 8/2007 | Chandra et al. | 370/335 |
| 2008/0130610 A1 * | 6/2008 | Karlsson | 370/342 |
| 2008/0233964 A1 * | 9/2008 | McCoy et al. | 455/450 |
| 2008/0253318 A1 * | 10/2008 | Malladi et al. | 370/328 |
| 2008/0268785 A1 * | 10/2008 | McCoy et al. | 455/67.11 |

FOREIGN PATENT DOCUMENTS

| WO | WO 03/096581 A | 11/2003 |
|---|---|---|
| WO | WO 2005/034559 A | 4/2005 |

OTHER PUBLICATIONS

Ghosh A. et al: "Overview of enhanced uplink for 3GPP W-CDMA" Vehicular Technology Conference, 2004. VTC 2004-Spring. 2004 IEEE 59th Milan, Italy May 17-19, 2004, Piscataway, NJ, USA, IEEE, US, vol. 4, May 17, 2004, pp. 2261-2265, XP010766561, ISBN: 978-0-7803-8255-8 abstract p. 2261, col. 1, line 20-col. 2, line 9; p. 2262, col. 2, line 21-line 39, (5 pages).
3GPP TSG RAN WG1 Meeting #48 R1-071000 St. Louis, USA, Feb. 12-16, 2007 Nokia; Title: Data-non-associated control signal transmission with UL data Agenda item: 6.9.1; Document for: Discussion and decision, (5 pages).
3GPP TSG RAN WG1 Meeting #49 R1-072224, Kobe, Japan, May 7-11, 2007 Agenda item: 7.13.2; Source: Samsung: Title: Uplink control signal transmission in presence of data Document for: Discussion/Decision, (3 pages).
International Search Report/Written Opinion of the ISA dated Mar. 9, 2009 in parallel International Application No. PCT/EP2008/057742 (17 pages).

* cited by examiner

*Primary Examiner* — Jung Park (57) ABSTRACT

One or more dynamically selected signaling bits are added in a downlink from a base station to user equipment (UE) so that the UE can use an adaptive "symbol space" for uplink feedback (CQI/HARQ) signaling and know from the extra added downlink signaling bits and the MCS currently signaled in parallel how big a symbol space to use at the moment for the uplink feedback.

21 Claims, 2 Drawing Sheets

ADAPTIVE TRANSPORT FORMAT UPLINK SIGNALING FOR DATA-NON-ASSOCIATED FEEDBACK CONTROL SIGNALS

CROSS-REFERENCE TO RELATED APPLICATION

This application claims priority from U.S. Provisional Application Ser. No. 60/936,377 filed Jun. 19, 2007.

BACKGROUND OF THE INVENTION

1. Technical Field

The invention relates to improving uplink feedback signaling.

2. Discussion of Related Art

| | Abbreviations |
|---|---|
| 3GPP | Third generation partnership program |
| A/N | ACK/NACK |
| ACK | Acknowledgement |
| BER | Bit Error Ratio |
| BLER | Block Error Ratio |
| BPSK | Binary Phase Shift Keying |
| CM | Cubic Metric |
| DL | Downlink |
| CQI | Channel Quality Indicator |
| CRC | Cyclic Redundancy Check |
| ECR | Effective Coding Rate |
| EDCH | Enhanced Dedicated Channel |
| ENSR | Estimated Signal to Noise Ratio |
| FB | Feedback |
| HARQ | Hybrid Automatic Repeat Request |
| LTE | Long Term Evolution |
| MCS | Modulation and Coding Scheme |
| MIMO | Multiple-Input Multiple-Output |
| NACK | Negative ACK |
| PAPR | Peak to Average Power Ratio |
| PAR | Peak-to-average ratio |
| PUSCH | Physical Uplink Shared Channel |
| QAM | Quadrative Amplitude Modulation |
| QoS | Quality of Service |
| QPSK | Quadrative Phase-Shift Keying |
| RRC | Radio Resource Control |
| RU | Resource Unit |
| SDMA | Space Division Multiple Access |
| SIMO | Single-Input Multiple-Output |
| SINR | Signal-to-Interference and Noise Ratio |
| SNR | Signal-to-Noise Ratio |
| TDM | Time Division Multiplexing |
| TFCI | Transport Format Combination Indicator |
| TFC | Transport Format Combination |
| TTI | Transmission Time Interval |
| UL | Uplink |
| UTRAN | Universal Terrestrial Radio Access Network |
| VoIP | Voice over Internet Protocol |

This invention arose in the context of developments underway in the UL part of UTRAN long term evolution (LTE) often referred as 3.9 G but is not limited to that context. Even though the uplink is the focus of this disclosure, the invention is not necessarily limited to the uplink.

For UMTS, multicodes are used for both the control and data channels and such is not available in LTE due to bad PAPR. The signaling has to be transmitted as inband signaling with the data transmission.

More particularly, the invention arose during consideration of resource allocation for non-data-associated control signals transmitted with UL data on the PUSCH (Physical Uplink Shared Channel). These control signals include ACK/NACK due to the DL transmission and CQI reporting which can be either periodic or scheduled.

In RAN1#46bis, it has been agreed that data non-associated uplink control signaling is to be multiplexed with UL data with time division multiplexing (TDM). Detailed operations have not been discussed yet in 3GPP.

As suggested above, although the invention is not limited to the specific context in which it arose, it proceeds from consideration of the basic problem of how to divide the available physical resources (i.e., symbol space and transmission power) between data-non-associated control and data channels in LTE UL system. Information about the symbol space division must be pre-known at both ends of the radio link in order to perform correct rate matching/de-matching and encoding/decoding operations for different channels. Although not limited to such a scenario, it is noted that in the LTE UL system, the eNode-B (base station) has to be in charge of the resource split between the control and data parts and signaling this information to the UE. This is mainly due to the following things:

Data-associated control signaling is not supported in LTE UL. Therefore UE cannot signal transport format indication to the eNode B.

Blind detection is not feasible in UL, not only from the receiver complexity point of view but also taking into account the fact that CRC may not be available so there is no handy criterion on which to base the decision which of multiple possible formats was actually transmitted.

A second problem is how to optimize the performance of data-non-associated control signaling. It is noted that power control will set the SINR target of PUSCH according to the data channel. Therefore, the control channel has to adapt to the SINR operation point set for data. Control signals have typically much tighter delay requirements. Furthermore, control signaling benefits neither from the fast link adaptation nor the HARQ. Therefore the coding for data-non-associated control signaling needs to be done with somewhat more margin.

A third problem relates to different performance requirements of UL data and control signals.

ACK/NACK BER should be about 0.1% (no HARQ)

CQI BLER should typically be less than 10% (no HARQ)

BLER of UL data channel(s) varies usually between 10% and 30% (depending on the HARQ operation point).

One way to adjust the available resources between control and data parts is to apply different power offset values for them. There are two main disadvantages regarding this power offset method:

PAR problem: It has been shown in [R1-072224] that PAR and CM are increased when higher power is configured for control rather than for data. [R1-072224] recommends that the control power should be limited not to exceed the data power. Furthermore, it is not possible to increase the Tx power of control signaling, when the UE is transmitting with full power (i.e., located at the cell edge). So power increase is inefficient in providing adequate quality in several cases in practice.

It is also noted that from resource utilization point of view, power reduction is not too economic since all the available power resources won't be utilized any more. This is equivalent to a waste of capacity.

R1-071000 presents another prior art technique, where the symbol space of data-non-associated control channels is tied to the data modulation used by UL data channel. This is simply a consequence of the fact that the number of bits that is conveyed with a symbol depends on the data modulation: QPSK, 16QAM and 64 QAM carry 2, 4 and 6 bits respectively, therefore the number of symbols needed to carry a given number of bits from coding of data-non-associated control signaling depends on the modulation used. The applied symbol space corresponding to different data modulations is signalled to the UE by means of higher layer signalling (RRC signalling).

A problem related to this technique is that it is unable to guarantee the QoS of the data-non-associated control signaling. It is noted that the BLER target of the UL data channel may vary quite a lot, depending on many issues and parameters:

Different services will have different QoS requirements anyway (e.g., delay performance, BLER). Therefore, it is problematic to tie the symbol space of data-non-associated control channel only for the MCS used by UL data.

Performance of data-non-associated control signalling depends not only on the SINR but also the number of RUs allocated for UL data. For that reason, the symbol space allocated for the control channel should vary also according to the bandwidth.

Propagation environment may change quite rapidly. RRC signaling may not be able to track these changes fast enough.

Feasibility of this method depends also on the UL HARQ scheme (adaptive vs. non-adaptive)

Therefore, it is difficult to provide sufficient quality for control signals if the symbol space of data-non-associated control is tied only to the modulation and coding scheme (MCS) used by UL data.

The disclosure that follows deals with transport format selection of data-non-associated control signals transmitted with UL data. Also disclosed are some special, non-limiting cases of transport format selection for UL data transmission.

SUMMARY OF THE INVENTION

According to a first aspect of the present invention, a method is provided comprising dynamically selecting a symbol space for data-non-associated uplink feedback control signaling, and sending the selected uplink feedback control signaling using the selected symbol space.

According to a second aspect of the present invention, user equipment is provided, comprising a decoder, responsive to a dynamic transport format control signal from a base station indicative of a dynamically selected transport format, for decoding said command signal for providing a decoded signal indicative of said dynamically selected transport format for use in data-non-associated uplink feedback control signaling, and an encoder, responsive to said decoded signal, for encoding feedback information according to said dynamically selected transport format for transmission to the base station using the selected transport format.

According to the third aspect of the present invention, a base station is provided, comprising an encoder, responsive to dynamically selected transport format component signals and to a data signal, for encoding said transport format component signals and said data signal for providing a dynamic transport format control signal for transmission from said base station to user equipment, said control signal indicative of a dynamically selected transport format for data-non-associated uplink signaling used by said user equipment, and a decoder, responsive to said data-non-associated uplink signaling, for decoding feedback information according to said dynamically selected transport format.

According to a fourth aspect of the present invention, a system is provided comprising user equipment according to the second aspect of the invention and a base station according to the third aspect of the invention.

According to a fifth aspect of the present invention, a computer program product is provided in which a program code is stored in a computer readable medium, said program code realizing the following when executed by a processor (a) dynamically selecting a symbol space for data-non-associated uplink feedback control signaling, and (b) sending the selected uplink feedback control signaling using the selected symbol space.

According to a sixth aspect of the present invention, apparatus is provided comprising means for dynamically selecting a symbol space for data-non-associated uplink feedback control signaling, and means for sending the selected uplink feedback control signaling using the selected symbol space.

The present invention provides a method for selecting the transport format combination (TFC) of control signals transmitted with UL data (PUSCH). It also provides a signaling scheme to support the current transport format selection method. It also provides some methods to control the transport format used by a shared data channel.

The invention teaches to select the coding and in particular the amount of symbols used for coding of the inband control information on, e.g., a PUSCH to achieve a targeted BLER for signaling and data which are typically different. By means of the invention signaling is reduced to a minimum level.

It is to be understood that all presented exemplary embodiments may also be used in any suitable combination.

Advantages

The main advantage of this invention is that physical UL resources can be utilized in a more efficient way. This is due to the fact that if only semi-static control is available overhead caused by data-non-associated control signalling cannot be optimized too accurately. Instead of that, the control channel resources are configured in such a way to be on the safe side, in terms of QoS of control signalling (this leads to higher overhead). Using the scheme disclosed in detail below, the QoS of data-non-associated control signalling transmitted with UL data can be adjusted and optimized in a flexible, fast and efficient way.

It is noted that in different scenarios, there are also other reasons than just the QoS aspect to change the format of data-non-associated control signalling dynamically. TFCI bit(s) can be used in many ways:

They can be used to select between optimized SIMO and MIMO configurations

They can be used to select some kind of "air-bag" configuration for data-non-associated control signalling (which has the best possible quality). Such a configuration can be selected e.g. by the base station, if there is risk that crucial control information is getting lost in UL and that would compromise DL performance e.g. due to insufficient knowledge of the UL channel quality. Such cases may occur for data bursts after some time of inactivity, if no dummy data exchange is done during the time of inactivity in order to save power. Due to the missing data exchange, the base station has neither up to date knowledge any more about the DL nor the UL channel quality. Once new data arrive e.g. for DL. it is essential to quickly get reliable CQI to be able to schedule these data efficiently. However, because the UL channel quality is not known as well, it is desirable to select a configuration for the UL control information that is on the safe side. This may waste some UL capacity, but allows to achieve a better DL capacity and quality of service.

They can be used to dynamically select between different CQI sizes (pre-allocated for certain CQI reporting scheme), e.g., based rapid changes in propagation environment These advantages are not exhaustive of the possible advantages of the present invention.

Disadvantages

Additional signalling burden (1-3 bits) related to allocation grant signalling

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
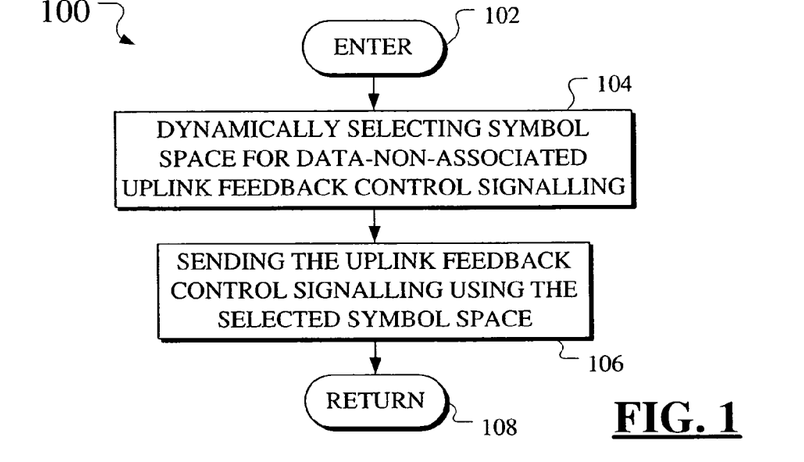
FIG. 1 is a flowchart illustrating a process that may be carried out in user equipment, according to the present invention.

FIG. 1 is a flowchart illustrating a process 100 that may be carried out in user equipment, according to the present invention. The process may be carried out by any kind of signal processing. After entering in a step 102, a step 104 is executed to dynamically select symbol space to be used for uplink signaling such as for data-non-associated uplink feedback control signaling. In a step 106, the process 100 then causes the user equipment to send the uplink feedback control signaling using the selected symbol space. The process then returns in a step 108.

Figure 2:
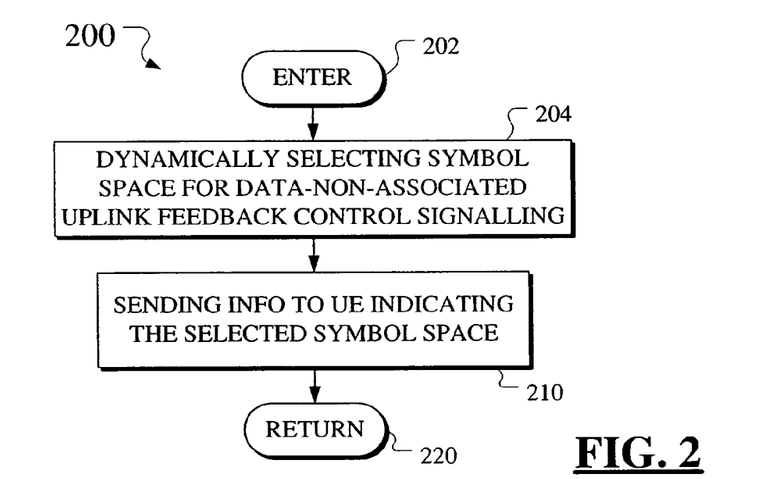
FIG. 2 is a flowchart illustrating a process that may be carried out in a base station, according to the present invention.

FIG. 2 shows a process 200 that may be carried out in a base station, according to the present invention. After entering in a step 202, a step 204 is executed to dynamically select a symbol space to be used for uplink signaling such as for data-non-associated uplink feedback control signaling. In a step 210, the process 200 then, causes the base station to send the uplink feedback control signaling to the user equipment in a downlink to command it to use the selected symbol space. Not shown is a step where the base station may store the selected symbol space for future reference when receiving the uplink signaling from the user equipment. The process then returns in a step 220.

Thus, although the step 104 of FIG. 1 could be decided by the user equipment on its own, FIG. 2 shows that the symbol space selection may actually be commanded to the user equipment in a preceding signaling step 210 by the base station. In that case, the step 104 of FIG. 1 represents the UE selecting the symbol space in response to the control signaling sent in the preceding step 210 of FIG. 2.

Figure 3:
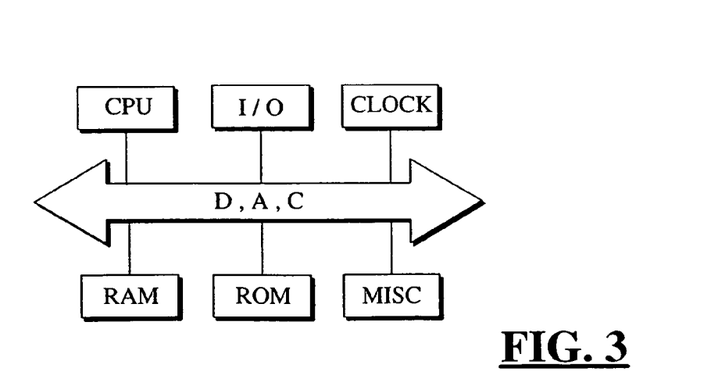
FIG. 3 illustrates a general purpose signal processor which may be used in the user equipment to carry out the process of FIG. 1 or in the base station to carry out the process of FIG. 2, or both.

FIG. 3 illustrates a general purpose signal processor which may be used in the user equipment to carry out the process 100 of FIG. 1. Such a processor includes a CPU, RAM, ROM, an input/output port, a clock, and miscellaneous other components all interconnected by data, address and control lines and may also be used in the base station to carry out the process 200 of FIG. 2. If software is used to carry out the process 100 or the process 200, it may be in the form of coded instructions embodied in a computer readable medium. It should be understood however that either or both of these processes 100, 200 may instead be carried out by other kinds of processors including but not limited to dedicated hardware such as an integrated circuit.

Figure 4:
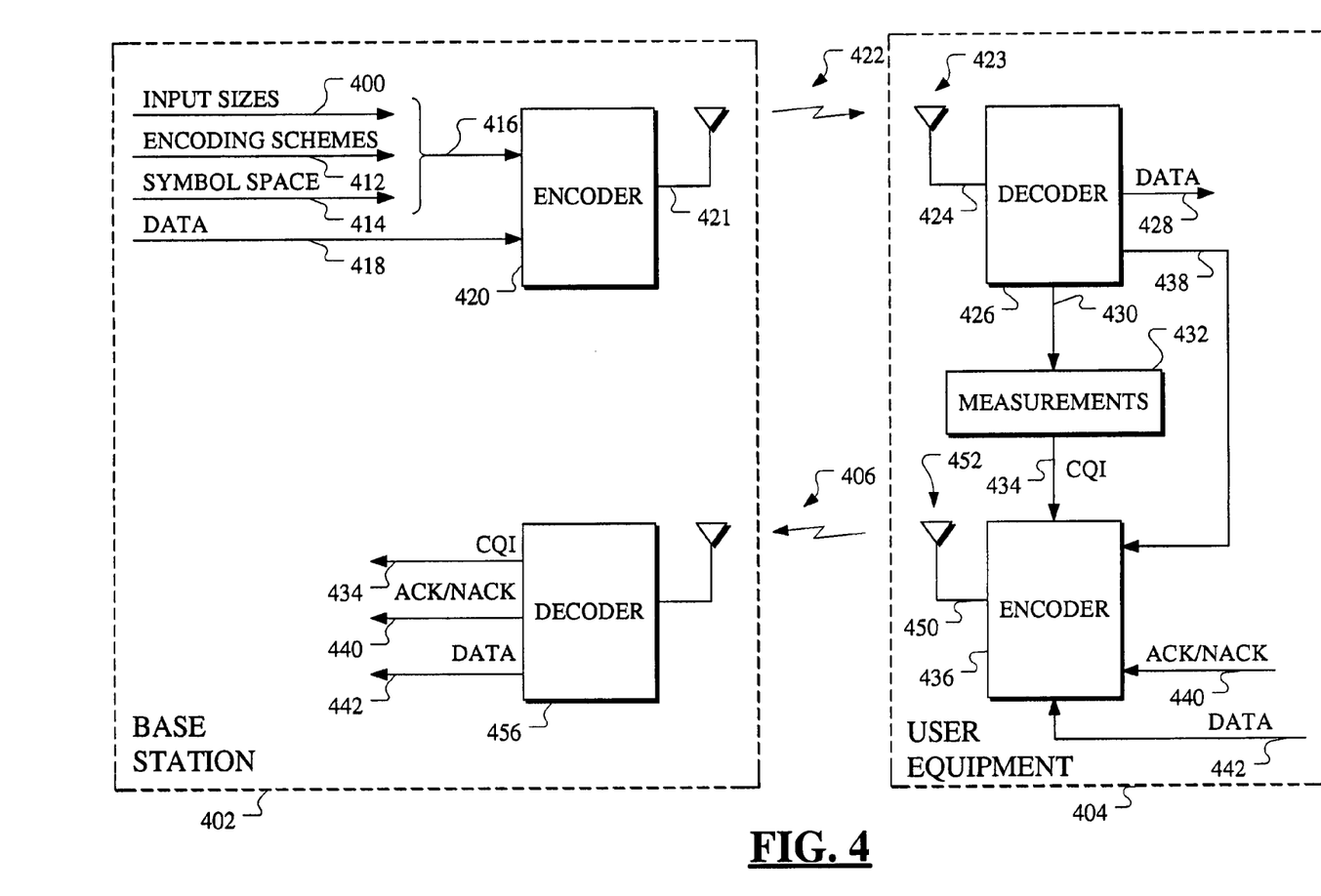
FIG. 4 shows an example of a scenario in which the present invention may be employed where a base station dynamically decides the symbol space to be used by user equipment in its feedback signaling included in an uplink that also includes uplink data.

FIG. 4 shows a non-limiting example of a scenario in which the present invention may be employed where a base station 402 dynamically selects the symbol space to be used by user equipment 404 in its feedback signaling included in an uplink 406 that also includes uplink data. Such signaling is carried on a so-called data-non-associated control or signaling channel of the uplink 406. A selector (not shown but that may take the form of the processor of FIG. 3) in the base station dynamically selects the symbol space (according to step 204 of FIG. 2) to be used along with some related parameters to be commanded to the user equipment for the user equipment to use in connection with the uplink signaling channel on the uplink 406. Such might include for instance an input size signal on a line 400, an encoding scheme signal on a line 412, as well as a symbol space signal on a line 414. Such signals are provided as shown generally on a line 416 to an encoder along with data on a line 418 to an encoder 420. In carrying out step 210 of FIG. 2, the encoder provides an output signal on a line 421 in which the data is combined with the signaling 400, 412, 414 for transmission via an antenna on a downlink 422 to the user equipment 404. Upon reception by an antenna 423 in the user equipment, a received downlink signal on a line 424 is provided to a decoder 426 in the UE 404. It decodes the data previously encoded on the line 418 and provides a decoded data signal on a line 428 for use in the UE 404. The decoder also provides a sensed signal on a line 430 indicative of the quality of the downlink. A measurement thereof may be made in a measurement component 432 that then provides a channel quality indicator (feedback) signal on a line 434 to an encoder 436. The decoder 426 also provides a command signal on a line 438 to the encoder 436 having information contained therein at least indicative of the symbol space information sent from the base station and possibly also the other information contained on the line 416. The encoder then carries out steps 104, 106 of FIG. 1 to dynamically select and use the symbol space for data-non-associated uplink signaling. If the decoded data on the line 428 is received correctly, an ACK signal is sent to the encoder 436 on the line 440. Otherwise, a NACK may be sent. Signal data intended for the uplink is provided on a line 442 to the encoder 436 and combined with the CQI and ARQ information for output on a line 450 from the encoder 436 to an antenna 452 for transmission on the uplink 406 to the base station. A decoder 456 in the base station provides the uplink CQI signal 434 to help carry out step 204 for the next dynamic selection of the symbol space for the data-non-associated uplink feedback control signaling to be used on the uplink 406.

Transport Format Selection Scheme

In the illustrated embodiment, the transport format configuration of data-non-associated control channels 434, 440 transmitted with UL data 442 is divided into two parts, (1) a semi-static part and (2) a dynamic part.

Semi-Static Part

The semi-static part is used to configure possible transport formats for data-non-associated control channels. It is possible to configure TFCs in such a way that different control signals (e.g., CQI) have
- different symbol space allocation (i.e. number of output bits of encoder 436) with different TFCs
- different number of input bits (i.e., CQI encoding scheme) with different TFCs. It is also possible to configure such a TFC in which the CQI message is not transmitted at all (zero CQI bits).

Dynamic Control Part

Dynamic parameters are used to select one of several pre-defined transport format combinations for each MCS for data-non-associated control signals transmitted with UL data.

Transport Format Selection

In the illustrated embodiment, eNode-B selector selects the actual transport format combination based on
- Service requirements related to UL data channel (e.g., BLER operation point)
- Bandwidth allocation of UL data channel (i.e., how many resource units)
- Measured UL QoS (SINR, BLER, data channel performance)
- Possible MIMO mode (UL/DL)
  - Virtual-MIMO in UL: Transport format combinations can be optimized separately for use in SIMO and virtual MIMO modes (the selected mode changes dynamically according to UL scheduler decisions). Virtual MIMO would benefit from block spreading applied for multiple control streams whereas in case of SIMO the signaling is optimized when spreading is not applied.
  - DL SIMO/MIMO transmission: Number of feedback (FB) bits varies between SIMO and different MIMO modes. Transport format combination can be optimized separately for use in SIMO and different MIMO modes.

Rate matching operation of UL data channel(s) is based on the transport format combination selected for the data-non-associated control channels. For example, Rate matching can be used for the UL data channel(s) to fit the data to use those symbols available for transmissions that have not been assigned for data-non-associated control signals.

Transport Format Signaling Scheme

Higher layer signaling is used to configure the applied transport format combinations for data-non-associated control signals transmitted with UL data.
- Number of TFCs configured by a higher layer should be limited to a relatively small number to avoid excessive signaling burden, in particular to limit the number of bits necessary to signal the TFC to be used in a particular TTI.
- It seems that four quantization levels would be enough in practice.
- The exact relation between the TFCI bits and the content of TFC is configurable (RRC signaling). TFCI signaling can be further optimized by reconfiguring the TFC set on the fly while the UE moves e.g., from cell center to cell edge.

As suggested above, dynamic control signaling may be used to select the actual transport format used for data-non-associated control signaling. Such signaling may be transmitted on the downlink 422 in/with UL allocation grant signaling. In another embodiment, the transport format indicator can be transmitted in/with DL allocation grant signaling. 2(1) bits might for instance be needed to configure 4(2) different transport format combinations for data-non-associated controls signaling. Such additional dynamic signaling bits may be viewed as "Dynamic TFCI".

If it is already contemplated to include a signaling bit into the UL allocation grant signaling to inform whether the corresponding DL allocation grant was transmitted or not (and consequently an ACK/NACK needs to be transmitted as data-non-associated control signaling), such could be adapted for purposes of the present invention as well. It is noted that having 2 bits reserved for this indication combined with Dynamic TFCI, would make it possible to utilize these bits in such a way that one signaling word (e.g., "00") corresponds to the case where ACK/NACK does not exist whereas the remaining signaling words ('01', '10' and '11') can represent the size of ACK/NACK resource when ACK/NACK is present. With this optimization only one additional bit on top of the bit which is used to indicate presence of the ACK/NACK signal in the prior art is needed to be able to signal 3 different TFCIs to be used for this ACK/NACK signal. If this information was used individually, one additional bit could only indicate two different TFCIs, causing a significantly coarser quantization. In one embodiment part of the TFCI is transmitted via UL grant signaling and another part via DL grant signaling.

In an additional embodiment the dynamic TFCI controls the number of ACK/NACK bits transmitted on PUCCH (Physical Uplink Control Channel).

In an additional embodiment the dynamic TFCI controls the number of ACK/NACK bits transmitted on PUSCH (Physical Uplink Control Channel).

The invention is applicable to TDD and FDD modes.

Explicit Segmentation Indicator

"Explicit segmentation indicator" transmitted with dynamic resource allocation signalling can be seen as an additional example of this invention. This indicator could be used e.g., in a VoIP application.

At the cell edge it may not be possible to transmit a data packet (say VoIP packet) in a single TTI. Then the packet can be transmitted using two HARQ transmissions, also called nominal mode, where the first transmission fails with a high probability, and the desired Block Error Rate is achieved after the second one. Of course, as an alternative, one can always subdivide the VoIP packet into two packets, but this will decrease the coding gain significantly because each of the packets is shorter and the coding gain of turbo codes decreases significantly for short packets (VoIP packets are not particularly big anyhow). It is also possible to use a higher code rate for initial transmission and always rely on retransmission(s) but then the standard rate matching approach would first send all the systematic bits and then only parity bits. This is undesirable as well as it represents a bad interleaver. In case of explicit segmentation, i.e. if an information that segmentation is to be used is included (e.g. via a signalling bit or other means) this information can be used to optimize the definition of redundancy versions that are specifically optimized for this case. Then a redundancy version can be defined e.g., in such a way, that odd and even bits are transmitted on odd and even frame numbers. If the first transmission happens to be on a odd frame number (or TTI number or subframe number, or another suitable identification number of a specific packet) then only the odd bits are transmitted. More specifically, among those bits that would be transmitted if twice as many bits were available for transmission, only the odd bits are selected. This gives exactly the number of bits available for transmission. For the next packet, which will be on an even frame number (or respective number) the even bits are selected. Thus after reception of both packets, the receiver has available exactly those bits, that would have been available for a hypothetical transmission that would have allowed transmission of twice as many bits as actually possible. The rate matching is designed to provide an optimal selection (within practical limits, e.g. complexity) for a given number of bits. Therefore the proposed algorithm will achieve a (practically) optimal selection of bits when combining two transmissions. According to the state of the art, the Rate matching algorithm would select a redundancy version that was optimal for the first transmission, however this is pointless as the first transmission is practically deemed to fail anyhow due to insufficient available transmission power, or because the coding rate is even above 1. According to the prior art, the combined first and second transmission would not be ideal. In particular, due to the prior art, the first transmission would contain exclusively or predominantly systematic bits, while the second one would contain predominantly or exclusively parity bits. Obviously, this is not a good distribution of these two kinds of bits on the two TTIs.

One approach to save one signalling bit in case of segmentation is to not to reserve ACK/NACK resource corresponding to the first TTI (the first transmission contains almost always an error in such case, so there is little use (little information) in almost always sending the NACK following the first transmission)

If such a segmentation bit is present, then, according to the present invention, the meaning of the TFCI signalling for data-non-associated control signaling is redefined, because it is an indication that there is a comparatively poor UL channel quality (at least too poor to transmit a packet in a single shot). In general more robust TFCIs will be associated, compared to the case where the segmentation (or nominal mode) is not indicated.

Another use case for the dynamic indicator is controlling of the transmission power used in HARQ retransmissions. An HARQ retransmission is used, if the first transmission was not successful. For HARQ, the receiver makes use of both the first reception (that had failed when decoded individually) and the second one, while conventional ARQ would only make use of the second one. Therefore for HARQ typically the retransmission can be sent with lower power respectively lower SNR. Consequently more symbols have to be used for data-non-associated control signaling for retransmissions compared to initial transmissions if otherwise the same parameters are used. The fact that a transmission is a retransmission can be derived from information on the used redundancy information, retransmission number a new data indicator that indicates transmission of a new packet or similar information.

Dynamic indicator could also be used to indicate the situation that there is a need to puncture more bits for control than in a non-nominal mode. Actually it may be less than one bit if all bits are collected into one comprehensive redundancy version-table such as done for EDCH. In this case there are not individual bits for segmentation indicator and dynamic indicator, but instead all the bits are pooled together to define an indicator into a comprehensive table, that includes both the segmentation indicator and the dynamic indicator or the segmentation indicator and the TFC. This table can be predefined or signalled similar to the table that was already described for associating the dynamic indicator with a TFC.

Tables 1-4 show examples of signaling schemes according to the invention. Table 1 presents a signaling format with one-bit TFCI signaling. Table 2 shows another signaling example with one-bit TFCI signaling. In Table 2 the size of the MCS domain is reduced from 5 to 3 (as compared to Table 1). Table 3 shows an example where the signaling is based only on dynamic TFCI signaling with two bits. Table 4 shows an example where the dynamic signaling is used to configure the number input bits of CQI signaling. It is noted that although the Table 4 only the CQI size varies, the usage of the invention is not limited into this example. In another case also the number of ACK/NACK bits can be changed. Table 5 shows such an example, where both the CQI size and ACK/NACK size vary, obviously it is also possible to vary the ACK/NACK size only and keep the CQI size constant.

TABLE 1

An example of a signalling format according to the invention

| Control type | | A/N | CQI | A/N | CQI |
|---|---|---|---|---|---|
| Control size (# of input bits) | | 1 bits | 10 bits | 1 bits | 10 bits |
| Dynamic TFI | | 0 | | 1 | |
| Symbol space of control channel as a function data channel MCS | MCS1 | 1 | 5 | 2 | 8 |
| | MCS2 | 4 | 8 | 8 | 12 |
| | MCS3 | 8 | 16 | 16 | 24 |
| | MCS4 | 12 | 24 | 24 | 36 |
| | MCS5 | 24 | 48 | 48 | 72 |

TABLE 2

Another example of a signalling format according to the invention

| Control type | | A/N | CQI | A/N | CQI |
|---|---|---|---|---|---|
| Control size (# of input bits) | | 1 bits | 10 bits | 1 bits | 10 bits |
| Dynamic | | 0 | | 1 | |
| Symbol space of control channel as a function data channel MCS | MCS1 | 2 | 5 | 12 | 24 |
| | MCS2 | 4 | 8 | 16 | 36 |
| | MCS3 | 8 | 16 | 24 | 48 |

TABLE 3

Yet another example of signalling format according to invention

| Control type | | A/N | CQI | A/N | CQI | A/N | CQI | A/N | CQI |
|---|---|---|---|---|---|---|---|---|---|
| Control size (# of input bits) | | 1 bits | 10 bits | 1 bits | 10 bits | 1 bits | 10 bits | 1 bits | 10 bits |
| Dynamic | | 0 | | 1 | | 2 | | 3 | |
| Symbol space of control channel as a function data channel MCS | MCS1 | 1 | 5 | 2 | 10 | 4 | 15 | 8 | 20 |
| | MCS2 | 12 | 24 | 16 | 32 | 20 | 40 | 24 | 48 |

TABLE 4

Still another example of a signalling format according to the invention

| Control type | | A/N | CQI | A/N | CQI |
|---|---|---|---|---|---|
| Control size (# of input bits) | | 1 bits | 10 bits | 1 bits | 40 bits |
| Dynamic | | 0 | | 1 | |
| Symbol space of control | MCS1 | 2 | 5 | 12 | 20 |
| channel as a function data | MCS2 | 4 | 8 | 16 | 32 |
| channel MCS | MCS3 | 8 | 16 | 24 | 64 |

TABLE 5

Still another example of a signalling format according to the invention

| Control type | | A/N | CQI | A/N | CQI |
|---|---|---|---|---|---|
| Control size (# of input bits) | | 1 bits | 10 bits | 2 bits | 40 bits |
| Dynamic | | 0 | | 1 | |
| Symbol space of control | MCS1 | 2 | 5 | 12 | 20 |
| channel as a function data | MCS2 | 4 | 8 | 16 | 32 |
| channel MCS | MCS3 | 8 | 16 | 24 | 64 |

In the proposed signaling scheme configurable parameters are
 CQI (number of input bits of encoder) and ACK/NACK sizes or only one of those.
 Number of output bits of encoder (encoding scheme for CQI)
 Encoding scheme
 Symbol space for data-non-associated control signaling
  separately for different modulation and coding schemes used by UL data channel
  separately for different transport formats of data-non-associated control channel It is noted that the modulation and coding scheme applied for the UL data channel can be mapped into different transport formats in different ways
 Modulation-specific approach
 MCS1 - - - 64 QAM
 MCS2 - - - 16QAM
 MCS3 - - - QPSK
 Modulation and coding scheme-specific approach
 MCS1 - - - 16QAM, ECR>2/3
 MCS2 - - - 16QAM, ECR<2/3
 MCS3 - - - QPSK, ECR>2/3
 MCS4 - - - QPSK, ECR<2/3

In a further embodiment of the present invention, the TFC to be used can be defined using algorithmic representations. In this approach, each MCS is associated to an Estimated Signal to Noise Ratio (ESNR). The ESNR can be computed in dependence of the coding rate and modulation rate of the selected MCS. Coding rate is the relation between the number of data bits and bits after coding and rate matching. In a second step, the TFC of the control signalling can then be derived in dependence of the ESNR. At first sight, it may be considered to be equivalent to define a direct association between MCS and TFC or an indirect association between ESNR and TFC. However, the latter approach lends itself easier to be put into formulas. For example, for the derivation of the number of symbols to be used for ACK/NACK signalling, the known formula for BPSK Bit error rate performance can be used to determine the required energy and consequently number of symbols to be used to reach a desired bit error rate. Also the relation between MCS and ESNR can be derived using a few explicit definitions for some MCS and appropriate interpolation between these for other ones or suitable approximations.

Note that the segmentation indicator can also be taken into account for this derivation: Because the target error rate is only achieved after the second transmission, the coding rate to be used in the calculation can be set to half the actual coding rate.

Also further transmission parameters can be taken into account in a similar way as the segmentation indicator: Depending on specific transmission parameters, the rule to derive the ESNR from the MCS can be changed. Either an offset to the MCS can be defined (in a similar way as for the segmentation indicator) or an offset can be applied to the ESNR directly. For example, some information may be available about the intended QoS (Quality of service) of a packet (or more precisely the service to which the data that are carried by that packet belongs). This QoS will determine the optimum BLER (Block Error Ratio) of the packet and this will affect the required SNR. So consequently this information can be also used to get an optimized setting of the ESNR. Further such parameters include but are not limited to usage of SIMO or MIMO for transmission. For MIMO, even for so called virtual MIMO, also called SDMA (Space Division Multiple Access) two streams are transmitted, this will typically cause some inter stream interference. This inter stream interference can be removed by interference cancellation techniques including successive interference cancellation, that performs multiple decoding runs of the data. However, for data-non-associated control signaling, there may be no coding (ACK/NACK) and then this interference cancellation may be less effective, meaning that more resources have to be spent than for the single stream case.

In a further refinement of the above embodiment, the number of bits that are used for data-non-associated control signaling instead of data transmission are taken into account. In other words, the above mentioned coding rate is calculated taking the number of symbols into account, which are used for the transmission of data-non-associated controls signaling. Note that this number is only derived as an output of the calculation, so in practice it is not known as an input parameter for the calculation. It can however be taken into account by an iterative solution, or by solving directly the corresponding system of equations. For practical implementations, the exact way of calculation e.g. the number of iterations to be performed and the starting value to be used must be pre known at both base station and mobile station in order to ensure that both calculate exactly the same result because otherwise decoding of both the data-non-associated control signaling and the data can fail.

In a further refinement, not only the modulation scheme and the code rate are taken into account, but also the size of the packet, e.g. the number of payload bits or the number of bits after encoding or the number of bits after rate matching or the number of symbols available for transmission or the number of allocated resource units. Basically each of these quantities is equivalent as one can be derived from another if code rate and/or modulation scheme are known as well. The reason for including this information as well is the fact that the coding gain for turbo codes increases with increasing block size. So if a larger block is encoded, a somewhat lower SNR is sufficient for a desired error rate. Consequently somewhat more symbols have to be used for data-non-associated control signaling.

The invention has been described primarily for the case that each UL packet is scheduled individually. It is however also applicable to the case, that several packets are scheduled with a single scheduling command, also sometimes called persistent scheduling. For example in the case of VoIP, a packet may be scheduled every 20 ms, because the voice encoder does deliver a coded voice packet every 20 ms. This approach reduces the scheduling overhead. Also for persistently scheduled packets, it may be necessary to include some data-non-associated control signaling and then the number of symbols to be set aside for this purpose must also be determined. One approach may be to substitute the persistent scheduling by explicit scheduling and apply the invention directly. Another approach can be to provide the necessary information already in the persistent scheduling command in a similar way as set out in this invention. Of course, it is also possible to combine these two approaches or to use slightly different parameters in those two cases.

What is claimed is:

1. A method comprising:
   decoding dynamically selected format control signaling,
   dynamically selecting, in response to the decoded dynamically selected format control signaling and in relation to other information, a symbol space for data-non-associated uplink control signaling,
   encoding the data-non-associated uplink control signaling using said symbol space, and
   sending the encoded data-non-associated uplink control signaling using the dynamically selected symbol space along with uplink data, wherein said other information comprises an indication of a modulation scheme or a modulation and coding scheme and wherein said symbol space is selected dynamically by reference to a pre-defined relation between said indicated modulation scheme or said modulation and coding scheme and said dynamically selected transport format indication.

2. The method according to claim 1, wherein said dynamically selected format control signaling is sent from a base station and said data-non-associated uplink control signaling is sent using said dynamically selected symbol space from user equipment to said base station.

3. The method according to claim 2, wherein said dynamically selected format control signaling is sent from said base station with said other information comprising control information including an indication of a modulation scheme or of a modulation and coding scheme and wherein the indication of the modulation scheme or of the modulation and coding scheme combined with the format control signaling defines said dynamic selecting of said symbol space for said data-non-associated uplink control signaling.

4. The method according to claim 1, wherein said format control signaling includes both a semi-static part comprising said other information and a dynamic part, wherein said dynamic part is used to control a number of symbols used for said data-non-associated uplink control signaling.

5. The method according to claim 1, wherein said symbol space comprises a number of bits of channel quality indicator feedback signalling or acknowledgement signalling, or both, for said encoding.

6. A method comprising:
   dynamically selecting a symbol space for data-non-associated uplink control signaling according to dynamically selected format control signaling;
   dynamically changing between a single-input-multiple-output mode and a virtual multiple-input-multiple-output mode according to uplink scheduler decisions;
   sending the selected data-non-associated uplink control signaling using the selected symbol space with transport format combinations optimized separately for said single-input-multiple-output mode and said virtual multiple-input-multiple-output mode wherein said virtual multiple-input-multiple-output mode benefits from block spreading applied for multiple control streams whereas in case of single-input-multiple-output mode, the signaling is optimized when spreading is not applied.

7. Apparatus, comprising:
   at least one processor; and
   at least one memory including computer program code, the at least one memory and the computer program code configured to, with the at least one processor, cause the apparatus at least to:
   decode a dynamic transport format control signal received from a base station indicative of a dynamically selected transport format, for decoding said control signal;
   provide a decoded signal indicative of said dynamically selected transport format; and
   encode data-non-associated uplink control signaling with a symbol space selected dynamically according both to said dynamically selected transport format indicated by said dynamic transport control signal and other information for transmission encoded with data to the base station wherein said other information comprises an indication of a modulation scheme or a modulation and coding scheme and wherein said symbol space is selected dynamically by reference to a pre-defined relation between said indicated modulation scheme or said modulation and coding scheme and said dynamically selected transport format indication.

8. The apparatus according to claim 7, wherein said format control signaling includes both a semi-static part and a dynamic part wherein said dynamic part is used to control a number of symbols used for said data-non-associated uplink control signaling.

9. The apparatus according to claim 7, wherein said data-non-associated uplink control signaling comprises a number of channel quality indicator feedback symbols or acknowledgement symbols or both.

10. User equipment, comprising:
    a decoder, responsive to a dynamic transport format control signal from a base station indicative of a dynamically selected transport format optimized for a single-input-multiple-output mode or for a virtual multiple-input-multiple-output mode selected according to dynamically changing uplink scheduler decisions made by said base station, said decoder for decoding said control signal for providing a decoded signal indicative of said dynamically selected transport format for use in data-non-associated uplink control signaling; and
    an encoder, responsive to said decoded signal, for encoding data-non-associated uplink control signaling according to said dynamically selected transport format for transmission to the base station using the selected transport format wherein said virtual multiple-input-multiple-output mode benefits from block spreading applied for multiple control streams whereas in case of single-input-multiple-output mode, the signaling is optimized when spreading is not applied.

11. Apparatus, comprising:
    a processor; and
    a memory including computer program code;
    the memory and the computer program code configured to, with the processor, cause the apparatus at least to:
    encode transport format component signals and a data signal for providing a dynamic transport format control signal for transmission from said apparatus to user equipment, said control signal indicative of a dynamically selected transport format for data-non-associated uplink signaling used by said user equipment; and
    data received along with decode said data-non-associated signaling from said user equipment encoded in a symbol space selected by said user equipment according to a pre-defined relation between at least two of said component signals of said dynamic transport format control signal and determined by said user equipment based on said relation, wherein said component signals include a transport format indicator of said symbol space and an encoding scheme indicator and wherein said feedback information encoded in said symbol space of said data-non-associated uplink signaling is selected dynamically by said user equipment by reference to a pre-defined relation between said indicated encoding scheme and said indicator of said symbol space.

12. The base station according to claim 11, wherein said dynamic transport format control signal includes both a semi-static part and a dynamic part wherein said dynamic part is used to control said symbol space and said semi-static part is used to control said encoding scheme.

13. The apparatus of claim 11, wherein said transport format indicator of said symbol space is one or two symbols for indicating, respectively, two symbol or four symbol alternative symbol spaces for each encoding scheme.

14. A base station, comprising:
an encoder, responsive to dynamically selected transport format component signals and to a data signal, for encoding said transport format component signals and said data signal for providing a dynamic transport format control signal for transmission from said base station to user equipment, said control signal indicative of a dynamically selected transport format for data-non-associated uplink signaling used by said user equipment; and
a decoder, responsive to said data-non-associated uplink signaling, for decoding feedback information according to said dynamically selected transport format, wherein transport format combinations can be optimized separately for single-input-multiple-output and virtual multiple-input-multiple-output modes wherein a selected mode changes dynamically.

15. A system comprising:
a base station, comprising:
an encoder, responsive to dynamically selected transport format component signals and to a data signal, said transport format component signals including an encoding scheme indicator and a symbol space indicator, said encoder for encoding said transport format component signals and said data signal for providing a combined data and dynamic transport format control signal for transmission from said base station to user equipment, said control signal indicative of a dynamically selected transport format for data-non-associated uplink control signaling for use by said user equipment; and
a decoder, responsive to said data-non-associated uplink control signaling from said user equipment, for decoding said data-non-associated uplink control signaling encoded in a symbol space selected by said user equipment according to a pre-defined relation between said encoding scheme indicator and said symbol space indicator; and
user equipment, comprising:
a decoder, responsive to said dynamic transport format control signal from said base station, for decoding said control signal for providing a decoded signal indicative of said dynamically selected transport format; and
a encoder, responsive to said decoded signal, for encoding said data-non-associated uplink control signaling in said symbol space selected according to said pre-defined relation between said encoding scheme indicator and said symbol space indicator for transmission to the base station.

16. A non-transitory computer readable medium in which program code is stored, said program code realizing the following when executed by a processor:
decoding dynamically selected format control signaling,
dynamically selecting, in response to the decoded dynamically selected format control signaling and in relation to other information, a symbol space for data-non-associated uplink control signaling, wherein said other information includes a modulation and coding scheme and wherein various alternative symbol spaces are selectable according to a pre-defined relation between said dynamically selected format control signaling and said other information,
encoding the data-non-associated uplink control signaling using said symbol space, and
sending the encoded data-non-associated uplink control signaling using the dynamically selected symbol space along with uplink data.

17. The non-transitory computer readable medium according to claim 16, wherein said dynamically selected format control signaling is sent from a base station and said data-non-associated uplink control signaling is sent using said dynamically selected symbol space from user equipment to said base station.

18. The non-transitory computer readable medium according to claim 16, wherein said format control signaling includes both a semi-static part and a dynamic part, wherein said dynamic part is used to control a number of symbols used for said data-non-associated uplink control signaling.

19. The non-transitory computer readable medium according to claim 16, wherein said other information comprises an encoding scheme.

20. The non-transitory computer readable medium according to claim 16, wherein said dynamically selected format control signaling is used to configure a number of input bits of channel quality indicator feedback signalling or acknowledgement signaling or both for said data-non-associated control signalling to a user equipment encoder.

21. Apparatus comprising:
means for decoding dynamically selected format control signaling;
means for dynamically selecting, in response to the decoded dynamically selected format control signaling and in relation to other information, a symbol space for data-non-associated uplink control signaling wherein said symbol space is selected dynamically by reference to a pre-defined relation between said indicated modulation scheme or said modulation and coding scheme and said dynamically selected transport format indication;
means for encoding the data-non-associated uplink control signaling using said symbol space; and
means for sending the encoded uplink data-non-associated control signaling using the dynamically selected symbol space along with uplink data.

* * * * *